US008732429B2

(12) United States Patent
Coronado et al.

(10) Patent No.: US 8,732,429 B2
(45) Date of Patent: May 20, 2014

(54) PRESERVING A DELETED DATA VOLUME

(75) Inventors: Juan A. Coronado, Tucson, AZ (US); Paul W. Garcia, Tucson, AZ (US); Beth A. Peterson, Tucson, AZ (US); Xavier E. Somoza, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 12/908,284

(22) Filed: Oct. 20, 2010

(65) Prior Publication Data

US 2012/0102279 A1    Apr. 26, 2012

(51) Int. Cl.
G06F 12/00    (2006.01)

(52) U.S. Cl.
USPC ............ 711/170; 711/162; 711/165; 707/663

(58) Field of Classification Search
USPC ................... 711/161, 162, 165, 170; 707/663
See application file for complete search history.

(56) References Cited

U.S. PATENT DOCUMENTS

| | | | |
|---|---|---|---|
| 4,750,106 A | 6/1988 | Aiken, Jr. | |
| 6,247,096 B1 * | 6/2001 | Fisher et al. | 711/114 |
| 6,286,104 B1 * | 9/2001 | Buhle et al. | 726/4 |
| 6,615,224 B1 * | 9/2003 | Davis | 707/610 |
| 6,691,309 B1 | 2/2004 | Lorie | |
| 7,428,621 B1 * | 9/2008 | Todd et al. | 711/161 |
| 2003/0090531 A1 | 5/2003 | Wong et al. | |
| 2004/0205145 A1 * | 10/2004 | Murakami | 709/213 |
| 2005/0091461 A1 * | 4/2005 | Kisley et al. | 711/162 |
| 2005/0207235 A1 * | 9/2005 | Blendermann et al. | 365/189.05 |
| 2007/0271306 A1 * | 11/2007 | Brown et al. | 707/200 |
| 2008/0189259 A1 * | 8/2008 | Kapur | 707/5 |

FOREIGN PATENT DOCUMENTS

WO    WO 2008061892 A1 *    5/2008

OTHER PUBLICATIONS

S.A. Weil et al., "Dynamic Metadata Management for Petabyte-scale File Systems", IEEE, Nov. 2004.
"Veritas Volume Manager 4.0", User's Guide, Veritas Software Corporation; 1990, pp. i-305.
"StorNext—Accelerate your business. Preserve your data.", Quantum, Jan. 2010.
"Data ONTAP 7.3—Storage Management Guide", NetApp, Inc., Jun. 2008, pp. 1-271.
"Snapshots & Data Protection—White Paper", Evolution—Rapid Evolution, 2006, pp. 1-10.

* cited by examiner

*Primary Examiner* — Kalpit Parikh
(74) *Attorney, Agent, or Firm* — Kunzler Law Group

(57) ABSTRACT

An apparatus, system, and method for preserving a deleted storage volume. One embodiment of the apparatus includes a receiving module, a reference module, and a preservation module. The receiving module receives a deletion command to delete a data volume managed by a storage controller. The data volume is associated with one or more deletion parameters specifying that data of the data volume is to be preserved upon deletion of the data volume. The reference module references the deletion parameters. The preservation module preserves the data of the data volume prior to the storage controller deleting the data volume. The preservation module preserves the data of the data volume according to the deletion parameters.

18 Claims, 10 Drawing Sheets

PRESERVING A DELETED DATA VOLUME

FIELD

The subject matter disclosed herein relates to data volumes and more particularly relates to preserving deleted data volumes.

BACKGROUND

Description of the Related Art

Certain storage controllers that store data as logical volumes typically allow a user to delete one or more logical volumes. Because data from a logical volume is lost once the user deletes the logical volume, some storage controllers include a control switch that prevents the user from deleting a logical volume if certain conditions are met, such as if the logical volume is on-line to a host or in a copy service relationship. The storage controller then typically prompts the user to enter an override parameter before the storage controller deletes the logical volume. However, even with the control switch and override parameter, a user may inadvertently delete a logical volume or purposefully delete a logical volume only to realize that desired data resided on the volume, thus losing data forever.

BRIEF SUMMARY

The present subject matter has been developed in response to the present state of the art. Accordingly, the present subject matter has been developed to provide an apparatus, system, and method for preserving a deleted data volume that overcome many or all of the above-discussed shortcomings in the art.

One embodiment of an apparatus for preserving a deleted data volume is provided with a plurality of modules configured to functionally execute the steps of receiving a deletion command to delete a data volume, referencing deletion parameters, and preserving the data of the data volume. These modules in the described embodiments include a receiving module, a reference module, and a preservation module.

The receiving module receives a deletion command to delete a data volume managed by a storage controller. The data volume is associated with one or more deletion parameters specifying that data of the data volume is to be preserved upon deletion of the data volume. The reference module references the deletion parameters. The preservation module preserves the data of the data volume prior to the storage controller deleting the data volume. The preservation module preserves the data of the data volume according to the deletion parameters.

One embodiment of a method is presented for preserving a deleted data volume. The method includes receiving a deletion command to delete a data volume managed by a storage controller. The data volume is associated with one or more deletion parameters. The deletion parameters specify that data of the data volume is to be preserved upon deletion of the data volume. The method includes referencing the deletion parameters. The deletion parameters are received in one of a creation command and the deletion command. The method also includes preserving the data of the data volume prior to the storage controller deleting the data volume. The data of the data volume is preserved according to the deletion parameters. The storage controller deletes the data volume.

One embodiment of a computer program product for preserving a deleted data volume is also presented. The computer program product includes code for receiving a deletion command to delete a data volume managed by a storage controller. The data volume is associated with one or more deletion parameters. The deletion parameters specify that data of the data volume is to be preserved upon deletion of the data volume. The computer program product also includes code for referencing the deletion parameters. The deletion parameters are received in a creation command or the deletion command. In addition, the computer program product includes code for migrating the data volume from one or more storage devices of a primary storage pool to one or more storage devices of a preservation storage pool prior to the storage controller deleting the data volume. The storage controller subsequently deletes the data volume from the primary storage pool.

One embodiment of a system is also presented for preserving a deleted data volume. The system may be embodied as a processor and a storage controller with a receiving module, a reference module, and a preservation module. The receiving module receives a command to delete a data volume managed by a storage controller. The data volume is associated with one or more deletion parameters specifying that data of the data volume is to be preserved upon deletion of the data volume. The reference module references the deletion parameters. The preservation module migrates the data volume from one or more storage devices of a primary storage pool to one or more storage devices of a preservation storage pool. The storage controller deletes the data volume.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the present subject matter will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
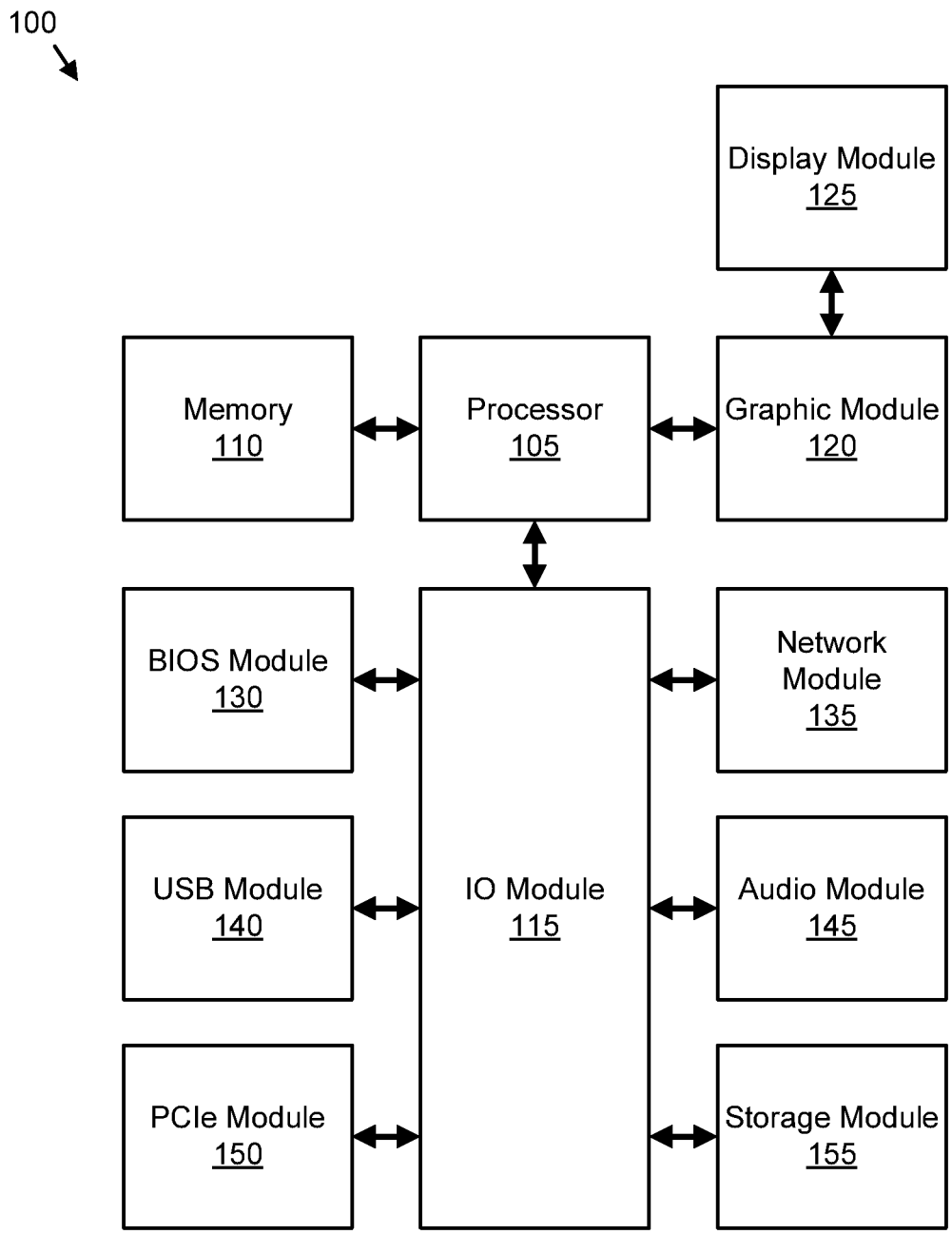
FIG. 1 is a schematic block diagram illustrating one embodiment of a computing device.

As will be appreciated by one skilled in the art, aspects of the present subject matter may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a computing device 100. The computing device 100 includes a processor 105, a memory 110, an IO module 115, a graphic module 120, a display module 125, a basic input/output system (BIOS) module 130, a network module 135, a universal serial bus (USB) module 140, an audio module 145, a peripheral component interconnect express (PCIe) module 150, and a storage module 155. One of skill in the art will recognize that other configurations of a computing device 100 or multiple computer systems 100 may be employed with the embodiments described herein.

The processor 105, memory 110, IO module 115, graphic module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device (SSD). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

The display module 125 may communicate with the graphic module 120 to display information as will be described hereafter. The display module 125 may be a cathode ray tube (CRT), a liquid crystal display (LCD) monitor, or the like.

The processor 105 may also communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the 10 module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like.

The USB module 140 may communicate with one or more USB compatible devices over a USB bus. The audio module 145 may generate an audio output.

In one embodiment, each module comprises a computer readable storage medium comprising a computer readable program stored on a tangible storage device.

Figure 2:
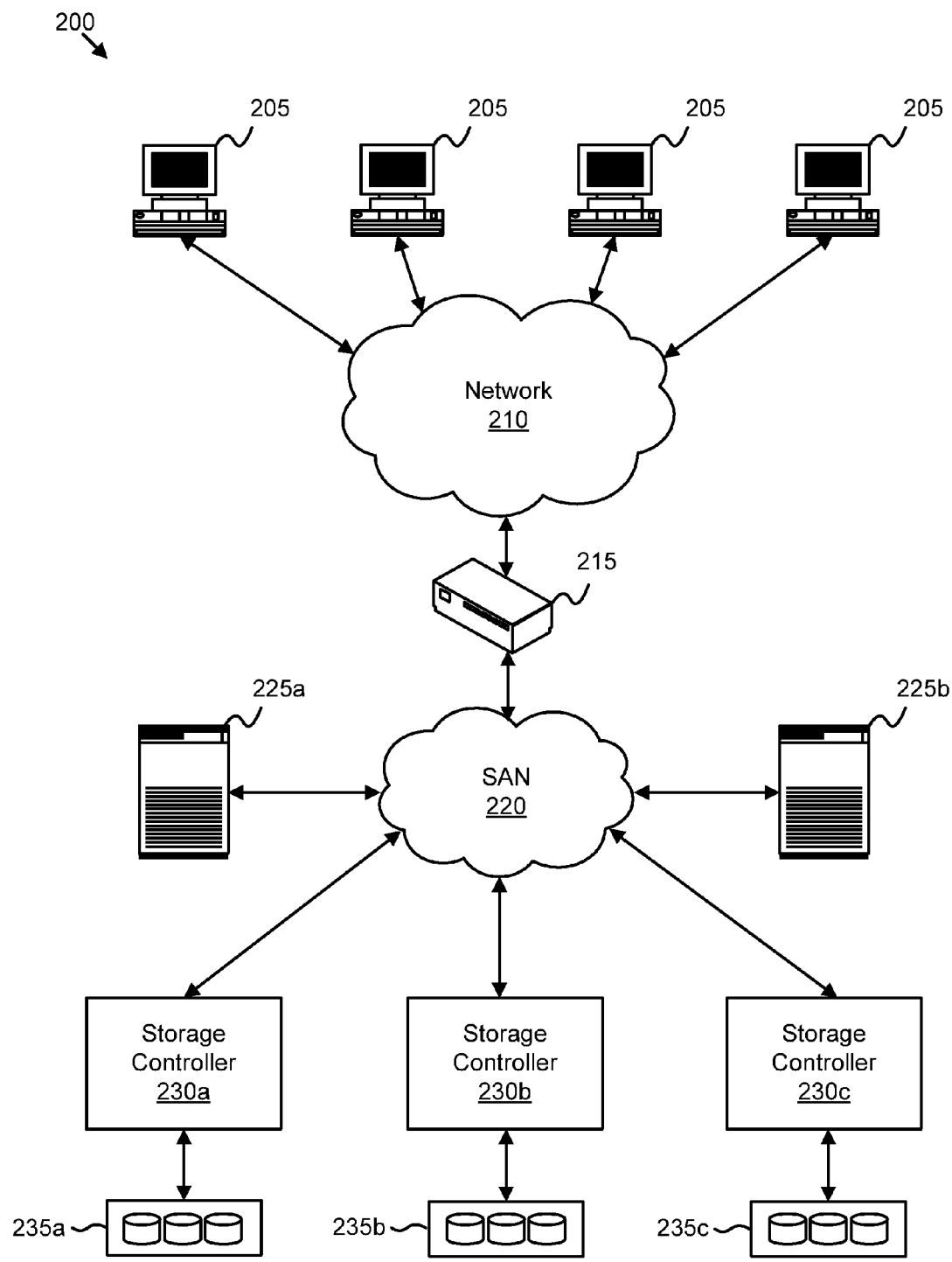
FIG. 2 is a schematic block diagram illustrating one embodiment of a system with data volume management capability.

FIG. 2 illustrates one embodiment of a system 200 with data volume management capability. The system 200 includes multiple clients 205, a network 210, a gateway 215, multiple hosts 225, a storage area network ("SAN") 220, and multiple storage controllers 230 in communication with storage pools 235. Each client 205 may be embodied as a desktop computer, a server, a handheld computing device, a portable computer, a mainframe computer, and the like. Furthermore, each client 205 may be in communication with the network 210. The network 210 may comprise a global communications network such as the Internet, a Local Area Network (LAN), multiple LANs communicating over the internet, or any other similar communications network.

A gateway 215 may be in communication with the network 210. The gateway 215 may comprise an interface between the network 210 and the SAN 220 as is known in the art. The gateway 215 may include a firewall, router, switch, server, and the like. The gateway 215 may be embodied as software, hardware, or a combination of hardware and software.

The SAN 220 may comprise a communication sub-network to facilitate communication between the hosts 225 and the storage controllers 230. As is known in the art, a SAN 220 may communicate using network protocols such as Fiber Channel, Internet small computer system interface ("iSCSI"), and the like. In other embodiments, the hosts 225 and the storage controllers 230 may communicate through another communication media such as a LAN, multiple LANs, or other similar network in place of or in addition to the SAN 220.

In the depicted embodiment, the hosts 225 are in communication with the SAN 220. Each host 225 may be computer, a server, a mainframe computer, and the like. In one embodiment, each host 225 is a System z series mainframe computer from International Business Machines ("IBM"). Each host 225 may run applications and/or provide a command prompt to interface with and/or control the storage controllers 230.

The hosts 225 may communicate with the storage controllers 230 through the SAN 220. In one embodiment, a single host 225a may communicate with a single storage controller 230a or multiple storage controllers 230a-c and multiple hosts 225a,b may communicate with a single storage controller 230a or multiple storage controllers 230a-c. As described above, each storage controller 230 may interface with applications and/or commands from one or more hosts 225. Additionally, a storage controller 230 may also interface with and/or receive commands from a computer coupled to or integrated with the storage controller 230b that provides a command line interface ("CLI") and/or graphical user interface ("GUI") that allows a user to manage the storage controller 230.

The storage controllers 230 control, manage, and/or facilitate data storage to coupled storage devices. The storage controllers 230 may be enterprise-level storage controllers 230 controlling storage pools 235 that include one or more storage devices. The storage pools 235 may comprise embedded storage 235 of storage devices integrated into the storage controller 230 and/or external storage devices. Furthermore, each storage controller 230 may be embodied as hardware, software, or a combination of hardware and software.

Additionally, while the system 200 depicts hosts 225 and storage controllers 230 as separate network entities, the system 200 may also include a host 225, storage controller 230, and storage devices residing in a single entity.

The storage devices of the storage pool 235 may include one or more physical volumes. Each physical volume may represent a physical subdivision of storage space. For example, a physical volume may correspond to a storage device, a partition, and the like. In addition, each physical volume may be further subdivided into portions of memory known as physical extents. Furthermore, the storage controller 230 may store data on storage devices of the storage pool 235 in logical volumes. Each logical volume may include a plurality of physical extents. In addition, a logical volume may not be confined to the boundaries of a physical volume and may span across multiple physical volumes.

In one embodiment, the storage controller 230 maintains a plurality of logical volumes in a logical volume group. This logical volume group may include a logical control unit ("LCU"), which is a logical subsystem of logical volumes. In one embodiment, each LCU includes up to 256 logical volumes. A host 225 may access a particular logical volume though logical paths to the LCU corresponding to the particular logical volume.

Each of the clients 225, gateway 215, hosts 225, and storage controllers 230 may include all or a portion of the components and modules described in relation to the computing device 100 of FIG. 1 including processors 105, memory 110, and the like.

Figure 3:
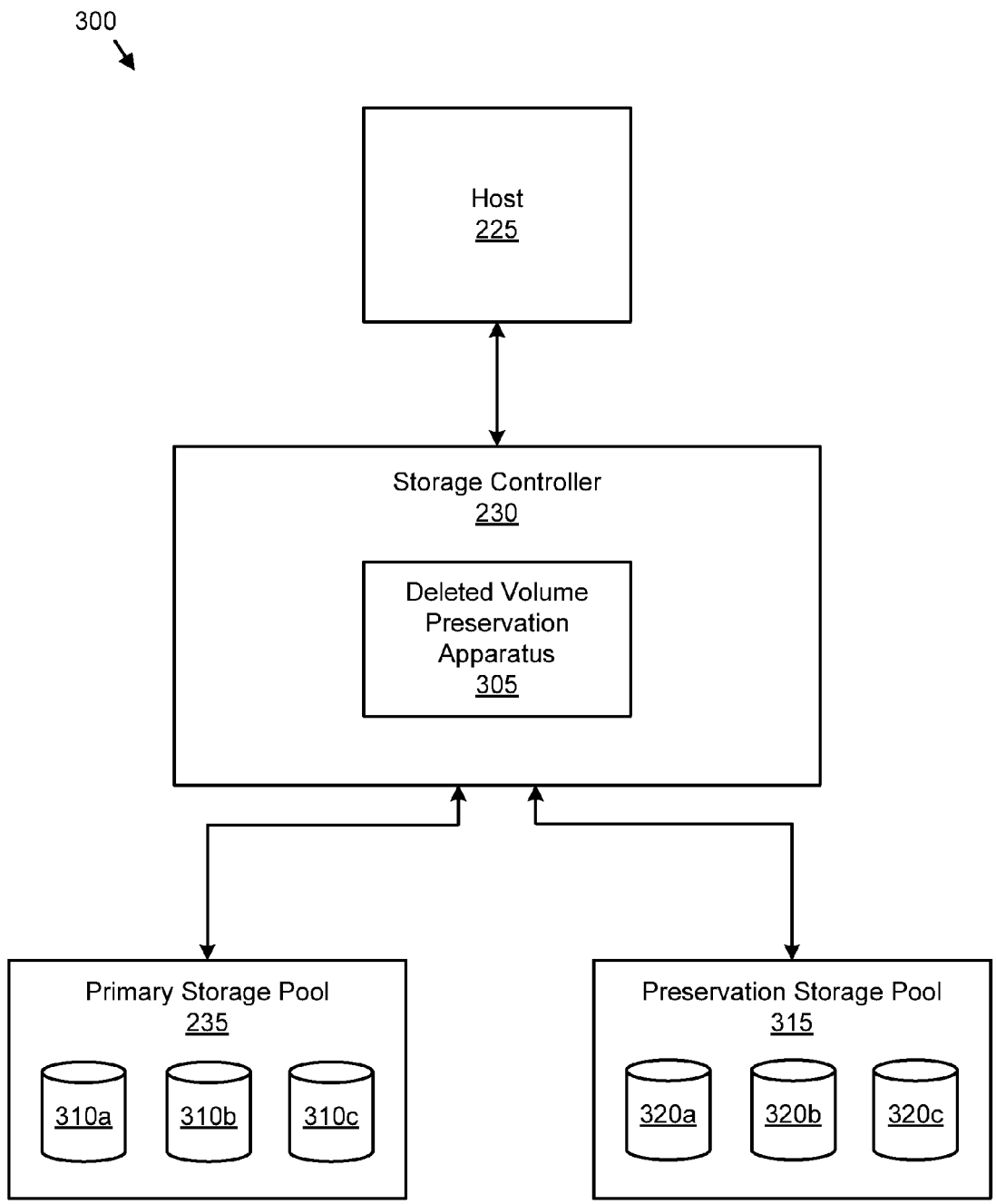
FIG. 3 is a schematic block diagram illustrating one embodiment of a system for preserving a deleted data volume.

FIG. 3 illustrates one embodiment of a system for preserving a deleted data volume 300. The system includes a host 225 in communication with a storage controller 230. The storage controller 230 communicates with a primary storage pool 235 and a preservation storage pool 315. Furthermore, the primary storage pool 235 and the preservation storage pool 315 each include storage devices 310, 320. The storage controller 230 includes a deleted volume preservation apparatus 305. The description of the system 300 refers to elements of FIG. 2, like numbers referring to like elements. Those of skill in the art recognize that the system 300 may be simpler or more complex than illustrated, so long as the system 300 includes modules or sub-systems that correspond to those described herein.

The host 225 may be substantially similar to one or more of the hosts 225 depicted in FIG. 2. The host 225 may be in communication with the storage controller 230 through a SAN 220 or other connection as described in FIG. 2. Similarly, the storage 230 controller 235 may also be substantially similar to one or more of the storage controllers 230 depicted in FIG. 2. The primary storage pool 235 may also be substantially similar to the storage pool 235 depicted in FIG. 2. Furthermore, in the depicted embodiment, the primary storage pool 235 includes a plurality of storage devices 310. Each storage device 310 may include a hard disk drive, an optical storage device, a holographic storage device, a micromechanical storage device, a solid-state storage drive, and the like.

The system 300 also includes a preservation storage pool 315. The preservation storage pool 315 also includes a plurality of storage devices 320. Each storage device 320 in the preservation storage pool 315 may include a hard disk drive, an optical storage device, a holographic storage device, a micromechanical storage device, a solid-state storage drive, and the like.

In one embodiment, the storage devices 310 of the primary storage pool 235 and the storage devices 320 of the preservation storage pool 315 have disparate, different and/or varying operational characteristics. In one embodiment, the storage devices 310 of the primary storage pool 235 and the storage devices 320 of the preservation storage pool 315 are different types of storage device. Operational characteristics may include, but are not limited to, performance characteristics, physical characteristics, and the like. For example, performance characteristics may include time and resource requirements during initialization or set-up procedures, when storing and retrieving data, when performing maintenance operations, during data backup operations, and the like. Performance characteristics may also include data integrity issues including error rates, data longevity, and the like. Physical characteristics may include cost of storage, heat generation, noise, power consumption, manufacturer, and the like. Operational characteristics may depend at least in part on and/or be inherent in the type of storage device 230,240 in the storage pool 235, 315.

In one embodiment, the storage devices 320 of the preservation storage pool 315 include storage devices 320 that have less cost per storage unit than storage devices 310 of the primary storage pool 235. In certain embodiments, the preservation storage pool 315 includes reserved storage for preserving volume data prior to deletion as described below. Although FIG. 3 depicts the storage controller 230 in communication with a primary storage pool 235 and a preservation storage pool 315, in other embodiments, the storage controller 230 may be in communication with a single storage pool or any suitable number of storage pools. For example, in one embodiment, the preservation storage pool 315 and the primary storage pool 235 are partitions in a single storage pool.

The deleted volume preservation apparatus 305 on the storage controller 230 facilitates preservation and recovery of a deleted data volume. In conventional storage controllers, once a data volume has been deleted, data from the data volume is unrecoverable. The deleted volume preservation apparatus 305 allows a data volume to be, upon command, migrated from a primary storage pool 235 to a preservation storage pool 315 (or in one embodiment, from a location in a storage pool to an alternate location in the same storage pool).

In one embodiment, the deleted volume preservation apparatus 305 migrates the data volume prior to deletion of the data volume upon the storage controller receiving a command to delete the data volume. Because the deleted data volume has been migrated to the preservation storage pool 315, a copy of the deleted data volume still exists. Consequently, a user may wish to retrieve the deleted data volume at a later time. The user may issue a retrieval command to the deleted volume preservation apparatus 305, which then may allow the user to access the deleted data volume. In one embodiment, the deleted volume preservation apparatus 305 migrates the deleted data volume from the preservation storage pool 315 back to the primary storage pool 235 and restores full-time access to the deleted data volume.

In certain embodiments, the deleted volume preservation apparatus 305 facilitates preservation of other suitable storage units including multiple logical volumes, a logical volume group, multiple logical volume groups, a physical volume, a group of physical volumes, and the like.

In one embodiment, the deleted volume preservation apparatus 305 may reside on the storage controller 230 as depicted. A user may interface with the deleted volume preservation apparatus 305 through a command line interface ("CLI"), graphical user interface ("GUI"), and/or application on the host 225 and/or other computing device in communication with the storage controller 230. While the depicted embodiment shows the deleted volume preservation apparatus 305 residing in the storage controller 230, all or portions of the deleted volume preservation apparatus 305, in other embodiments, may reside on the host 225, client 205, storage devices 310, 320 and/or other device in communication with the storage controller 230.

Figure 4:
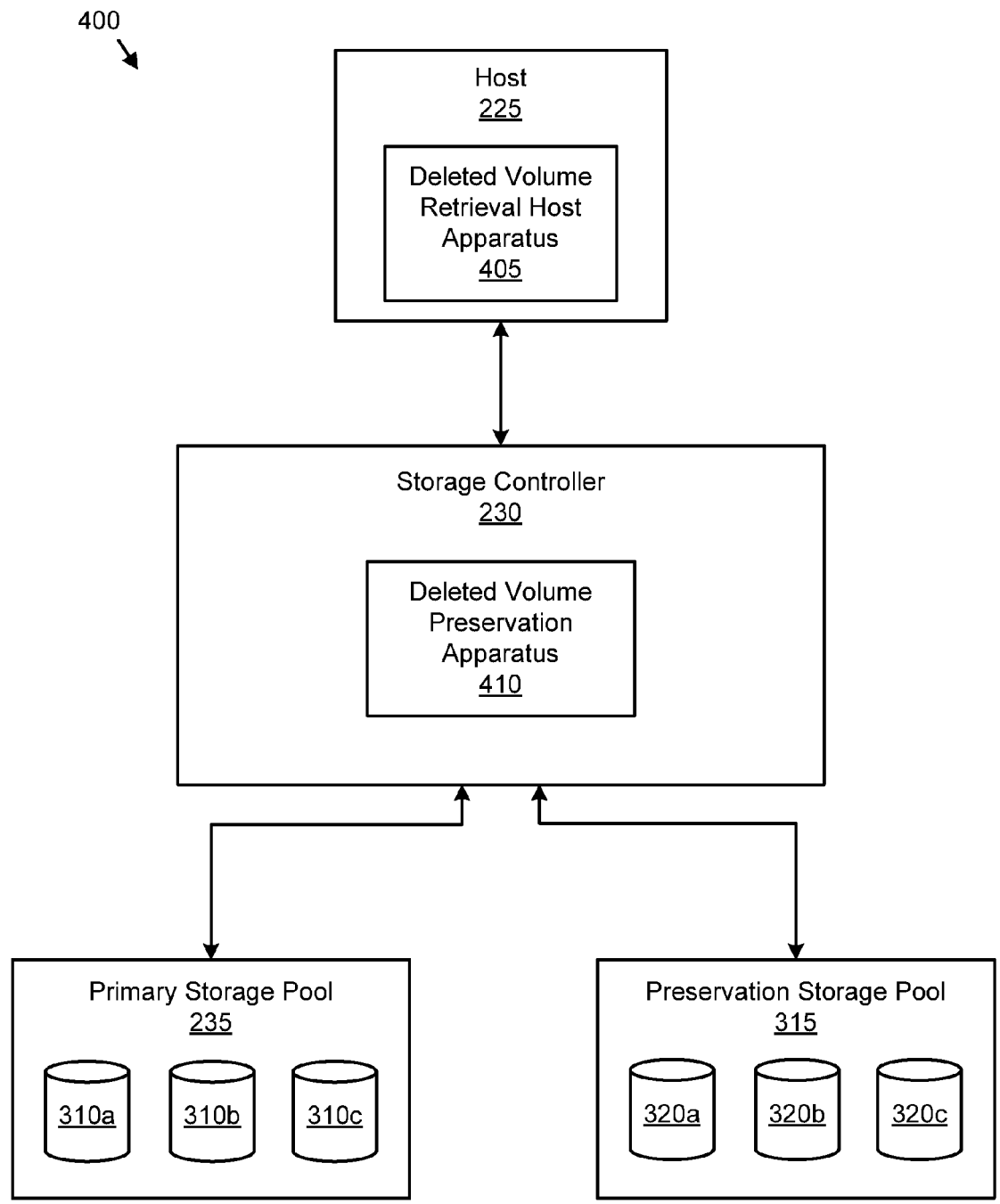
FIG. 4 is a schematic block diagram illustrating another embodiment of a system for preserving a deleted data volume.

FIG. 4 illustrates another embodiment of a system 400 for preserving a deleted data volume. As with the system 300 depicted in FIG. 3, the system 400 includes a storage controller 230, a primary storage pool 235 with storage devices 310 and a preservation storage pool 315 with storage devices 320, which may be similar to the like number elements of FIG. 3. As with the system 300 of FIG. 3, the storage controller 230 includes a deleted volume preservation apparatus 410 that may be similar to the deleted volume preservation apparatus 305 depicted in FIG. 3 with additional host-interaction capabilities as described below. In addition, the system includes a host 225 with a deleted volume retrieval host apparatus 405. The description of the system 300 refers to elements of FIG. 2, like numbers referring to like elements.

The deleted volume retrieval host apparatus 405 allows a host to automatically retrieve a deleted data volume that has been preserved by the deleted volume preservation apparatus 410. The deleted volume retrieval host apparatus 405 may allow a host 225 to query for a data volume to verify whether the data volume has been preserved. The deleted volume retrieval host apparatus 405 may send a retrieval command to the deleted volume preservation apparatus 410. The deleted volume preservation apparatus 410 may be configured to receive queries from the host as to availability of deleted data volumes and then may allow the host 225 to access the deleted data volume and/or retrieves and restores the deleted data volume back to the primary storage pool 235 as described above. Consequently, a host 225 may automatically obtain access to a deleted data volume.

While the depicted embodiment shows the deleted volume retrieval host apparatus 405 residing in the host 405, portions of the deleted volume retrieval host apparatus 405, in other embodiments, may reside on the client 205, storage controller 230, and/or other device in communication with the storage controller 230 and/or host 225.

Figure 5:
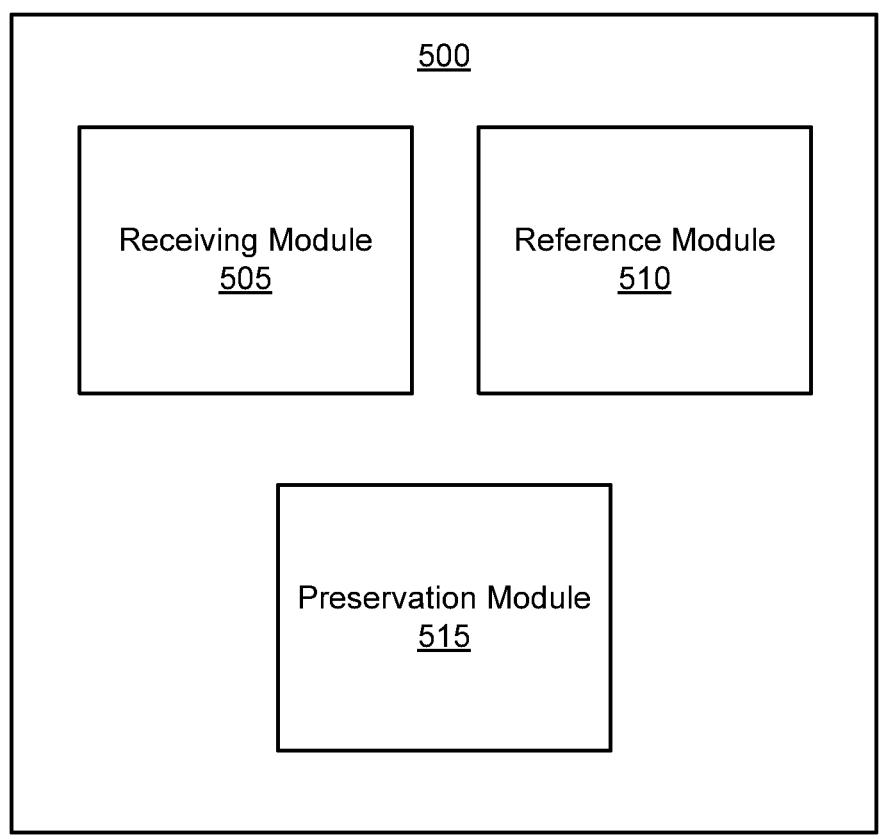
FIG. 5 is a schematic block diagram illustrating one embodiment of a deleted volume preservation apparatus.

FIG. 5 illustrates one embodiment of a deleted volume preservation apparatus 500 for advanced function monitoring on a storage controller 230. The deleted volume preservation apparatus 500 may be one embodiment of the deleted volume preservation apparatus 305 depicted in FIG. 3 or the deleted volume preservation apparatus 410 depicted in FIG. 4. The description of the volume preservation apparatus 500 refers to elements of FIGS. 1-4, like numbers referring to like elements. The volume preservation apparatus 500 includes a receiving module 505, a reference module 510, and a preservation module 515. The description for the following modules includes the term "data volume" (referring to a logical volume in one embodiment) in relation to preserving a data volume, receiving or sending commands for a data volume, migrating a data volume, and the like. However, in certain embodiments, the following modules may also use multiple logical volumes, a logical volume group (e.g. a group of logical volumes, such as an LCU), multiple logical volume groups (e.g. multiple LCUs), or any other suitable storage unit including a physical volume, a group of physical volumes, and the like.

The receiving module 505 receives a deletion command to delete a data volume. The data volume may be managed by a storage controller 230 as described above and, in one embodiment, the data volume is a logical volume.

The receiving module 505 may receive the deletion command by way of a command line interface ("CLI") and/or graphical user interface ("GUI") on a computer in communication with the receiving module 505. For example, a user may enter a deletion command using a CLI operating on a computer.

Furthermore, the data volume is associated with one or more deletion parameters that specify that the data volume (or other suitable storage unit) is to be preserved upon its deletion. To preserve the data volume includes preserving the data volume, data of the data volume and/or metadata of the data volume. In addition to specifying that the data volume should be preserved, the deletion parameters may also specify characteristics relating to preservation of the data volume such as a data preservation retention time, a data preservation priority, and/or one or more data preservation limitations. The data preservation retention time may specify how long the data volume is to be preserved after deletion. The data preservation priority may specify a priority of a deleted data volume in relation to other deleted data volumes. Furthermore, the data preservation limitations may specify an available storage space requirement to preserve a data volume, an available storage space threshold in which to begin overwriting deleted data volumes of lower priorities, and the like.

The deletion parameters may be new parameters, different from and/or in addition to parameters associated with conventional data volume creation and deletion commands. The deletion parameters may comprise additional parameters of the creation command and the receiving module 505 may receive the deletion parameters for a particular data volume as part of a creation command to create the particular data volume. The receiving module 505 and/or storage controller 230 may store the deletion parameters received at data volume creation time. In one embodiment, the receiving module 505 and/or storage controller 230 stores the deletion parameters as part of metadata stored with the data volume and/or metadata otherwise associated with the data volume.

The reference module 510 references the deletion parameters. As stated above, the deletion parameters may originate from a creation command to create the data volume or from a deletion command to delete the data volume. In one embodiment, the reference module 510 references stored deletion parameters originating from the creation command when the storage controller 230 created the data volume. Specifically, the reference module 510 may reference the deletion parameters stored as data volume metadata in association with a created volume. In one embodiment, the reference module 510 references deletion parameters as input parameters from the deletion command itself.

The preservation module 515 preserves the data of the data volume prior to the storage controller 230 deleting the data volume. In one embodiment, the preservation module 515 preserves the data of the data volume by migrating, moving, and/or copying the data volume to an additional location. The additional location may be located in the same storage pool as the storage pool in which the data volume was stored before deletion. In other embodiments, the additional location may be in a different storage pool. Specifically, in one embodiment, the preservation module 515 migrates the data volume from one or more storage devices 310 of a primary storage pool 235 to one or more storage devices 320 of a preservation storage pool 315. As described above, in one embodiment, the one or more storage devices of the primary storage pool 235 and the one or more storage devices of the preservation storage pool 315 have disparate operational characteristics. For example, the storage devices of the primary storage pool 235 may be solid-state storage devices and the storage devices of the preservation storage pool 315 may be Serial Advanced Technology Attachment ("SATA") storage devices.

The preservation module 515 preserves the data of the data volume according to the deletion parameters. As stated above, the deletion parameters may specify characteristics relating to preserving the data volume. For example, the deletion parameters, in one embodiment, specify where to migrate the data volume prior to deletion. In one embodiment, the deletion parameters are stored as metadata with the migrated data volume.

In one embodiment, the preservation module 515 checks an amount of storage space in the preservation storage pool 315 and/or other storage area designated to preserve deleted volume data. If the amount of storage space meets a low space threshold, the preservation module 515 may delete the oldest preserved data volumes and/or lowest priority data volumes (as determined by the metadata stored the preserved data volumes) until the amount of storage space is above the threshold. In certain embodiments, the preservation module 515 deletes "expired" preserved data volumes, or data volumes that meet an expiration date specified in the metadata stored with the preserved data volume.

In one embodiment, the preservation module 515 receives removal commands to remove preserved data volumes. For example, the preservation module 515 may receive a removal command for a particular preserved data volume stored in the preservation storage pool 315 and the preservation module 515 may delete and/or remove the particular preserved data volume from the preservation storage pool 315.

Figure 6:
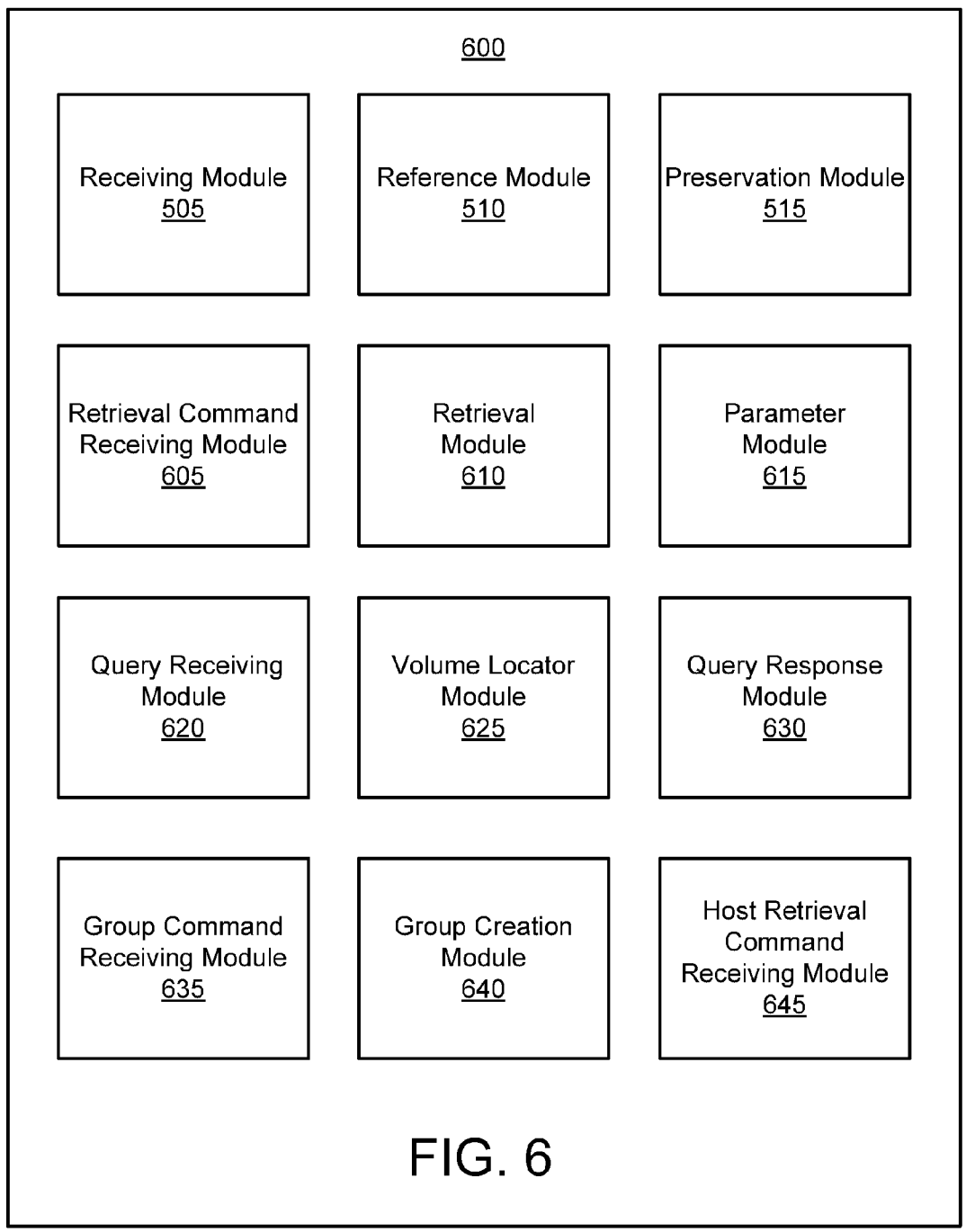
FIG. 6 is a detailed schematic block diagram illustrating another embodiment of a deleted volume preservation apparatus.

FIG. 6 illustrates another embodiment of a deleted volume preservation apparatus 600. The deleted volume preservation apparatus 600 may be one embodiment of the deleted volume preservation apparatus 305 depicted in FIG. 3 or the deleted volume preservation apparatus 410 depicted in FIG. 4. The description of the deleted volume preservation apparatus 600 refers to elements of FIGS. 1-5, like numbers referring to like elements. The deleted volume preservation apparatus 600 includes the receiving module 505, the reference module 510, and the preservation module 515, wherein these modules include substantially the same features as described in relation to the like-numbered modules in FIG. 4.

In addition, the deleted volume preservation apparatus 600 further includes a retrieval command receiving module 605, a retrieval module 610, a parameter module 615, a query receiving module 620, a volume locator module 625, a query response module 630, a group command receiving module 635, a group creation module 640, and a host retrieval command receiving module 645. As with the modules in FIG. 5, the description for the following modules includes the term "data volume" in relation to preserving a data volume, receiving or sending commands for a data volume, migrating a data volume, and the like. However, in certain embodiments, the following modules may also use multiple logical volumes, a logical volume group (e.g. a group of logical volumes, such as an LCU), multiple logical volume groups (e.g. multiple LCUs), or any other suitable storage unit including a physical volume, a group of physical volumes, and the like.

The retrieval command receiving module 605 receives a retrieval command to retrieve a data volume. In one embodiment, the retrieval command receiving module 605 receives the retrieval command from a host 225 or a computer coupled to or integrated with the storage controller 230*b* that provides a command line interface ("CLI") and/or graphical user interface ("GUI"). A user may enter the retrieval command into the CLI and/or the GUI. The computer/host 225 may transmit the retrieval command to the retrieval command receiving module 605 which receives the retrieval command. In certain embodiments, the retrieval command may include retrieval parameters that specify an identity of the desired data volume for retrieval and/or a storage pool to retrieve the data volume to. The retrieval parameters may also specify an existing data volume to replace with the retrieved volume.

The retrieval module 610 retrieves and/or makes accessible a data volume that has been preserved prior to deletion as described above. The retrieval module 610 may retrieve a preserved data volume in response to the retrieval command receiving module 605 receiving the retrieval command. In one embodiment, the retrieval module 610 migrates a preserved data volume from the location where the preservation module 515 migrated the data volume prior to deletion. Specifically, the retrieval module 610 may migrate the preserved data volume from storage devices 320 of the preservation storage pool 315 to storage devices 310 of the primary storage pool 235 in response to the retrieval command receiving module 605 receiving the retrieval command.

The retrieval module 610 may create metadata and allocate space for a new data volume. The retrieval module 610 may migrate the data volume from its current pool (e.g. the preservation storage pool 315) to the primary storage pool 315 and/or the storage pool the data volume was previously located before deletion. The retrieval module 610 may also migrate the metadata including a volume identifier and/or modify the metadata to reflect any changes in the retrieved volume's new location.

In one embodiment, the retrieval module 610 may migrate the data volume, replacing an existing data volume specified in retrieval parameters. The retrieval module 610 may migrate the data volume to an existing logical volume group also specified in the retrieval parameters. In one embodiment, the retrieval module 610 migrates the data volume to the logical volume group that the data volume was originally part of.

The parameter module 615 receives the deletion parameters in a creation command to create the data volume and/or the deletion command itself. The parameter module 615 may receive the deletion parameters for a particular data volume as part of a creation command to create the particular data volume. The parameter module 615 and/or storage controller 230 may store the deletion parameters received at data volume creation time. In one embodiment, the parameter module 615 and/or storage controller 230 stores the deletion parameters as part of metadata stored with the data volume and/or metadata otherwise associated with the data volume. In one embodiment, the parameter module 510 receives and/or references deletion parameters as input parameters from the deletion command itself.

In one embodiment, the query receiving module 620 receives a query for the data volume from a host 225. The host 225 sends the query to determine whether the data volume is available for retrieval. In one embodiment, the host 225 automatically sends the query in response to receiving a status message from the storage controller 230 that a data volume is no longer available (e.g. it has been deleted). For example, the host 225 may attempt to access a data volume and receive the status message in response to the attempted access.

The volume locator module 625 attempts to locate the preserved data of a particular data volume in response to the query receiving module 620 receiving a query for the particular data volume. If the volume locator module 625 locates the particular (preserved) data volume and/or preserved data of the particular data volume, the volume locator module 625 may determine that the particular data volume is available for retrieval. For example, the volume locator module 625 may query for metadata of the particular data volume or query the storage pool (such as the preservation storage pool 315) used to save the particular data volume for preservation to locate the particular data volume. The volume locator module 625 may also determine that the particular data volume is irretrievable in response to failing to locate the particular data volume (e.g. the data volume was deleted without preservation).

The query response module 630 sends an indication to the host 225 that the data volume is available for retrieval in response to the volume locator module 625 determining that the data volume is available for retrieval. The query response module 630 may send the indication in the form of a command, signal, or any suitable communication method.

The group command receiving module 635 receives a volume group creation command from a host 225. The host 225 may send the group creation command in response to determining that a logical volume group corresponding to the data volume has been deleted. In certain embodiments, the host accesses a data volume though logical paths to the logical volume group (e.g. LCU) corresponding to the data volume. Consequently, the host may send a volume group creation command to create a logical volume group for the data volume in preparation of retrieving the data volume. In one embodiment, the group command receiving module 635 receives a volume group creation command at a data volume in another logical volume group (because the desired logical volume group has been deleted). In one embodiment, the group command receiving module 635 receives a volume group creation command at device 0 in LCU 0.

The group creation module 640 creates/recreates a logical volume group for one or more deleted storage volumes. In one embodiment, the group creation module 640 creates the logical volume group in response to the group command receiving module 635 receiving the group creation command from the host 225. In some embodiments, the group creation module 640 includes logic to determine whether the logical volume group exists or whether it needs to be created and creates the logical volume group in response to determining that the logical volume group does not exist and needs to be created. In one embodiment, the group creation module 640 sends a group creation notification to the host 225 indicating that the group has been created. In one embodiment, the group creation notification comprises a state change notification.

The host retrieval command receiving module 645 receives a retrieval command from a host 225 to retrieve the data volume. For example, an application executing on the host 225 may send the retrieval command to the host retrieval command receiving module 645. In certain embodiments, the retrieval command may include retrieval parameters that specify a storage pool to retrieve the data volume to. The retrieval parameters may also specify an existing data volume to replace with the retrieved volume.

Figure 7:
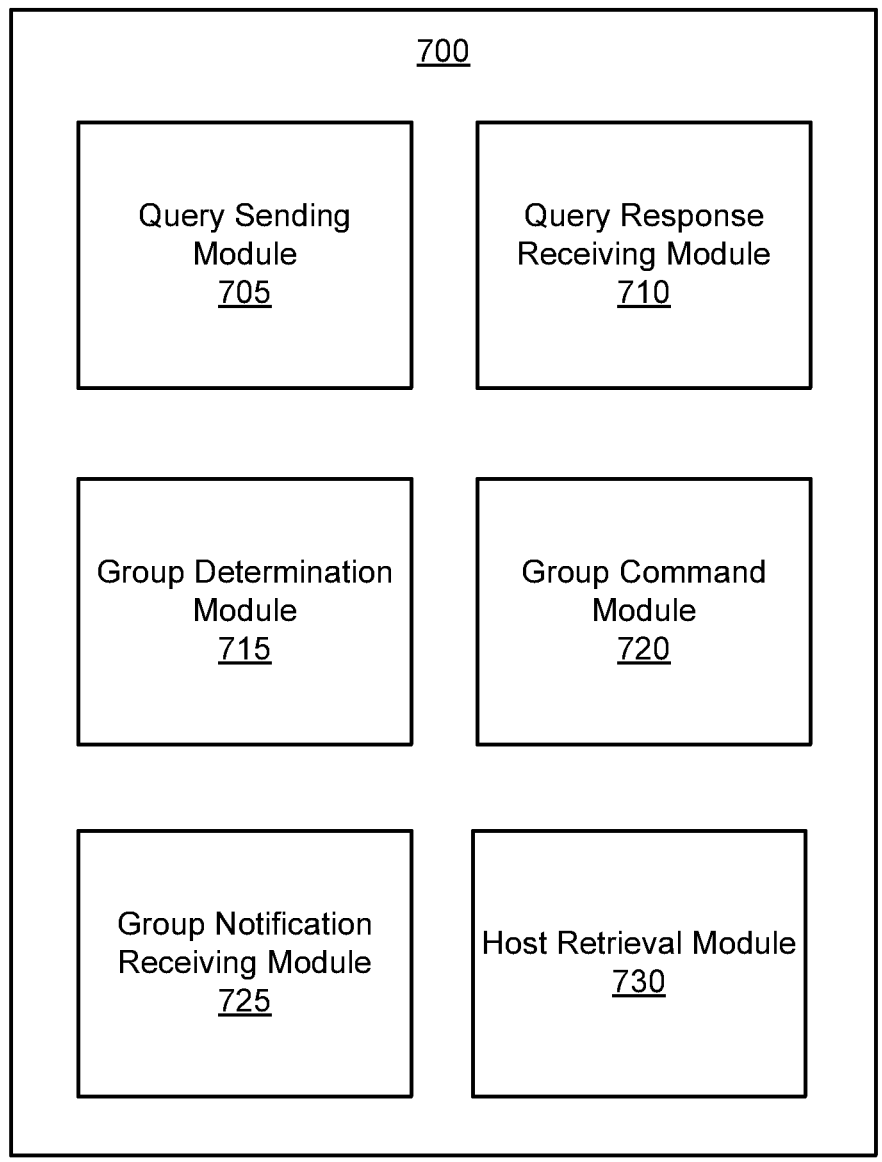
FIG. 7 is a schematic block diagram illustrating one embodiment of a deleted volume retrieval host apparatus.

FIG. 7 illustrates one embodiment of a deleted volume retrieval host apparatus 700. The deleted volume retrieval host apparatus 700 may be one embodiment of the deleted volume retrieval host apparatus 405 depicted in FIG. 4. The description of the deleted volume retrieval host apparatus 700 refers to elements of FIGS. 1, 2, and 4-6, like numbers referring to like elements. The deleted volume retrieval host apparatus 700 includes a query sending module 705, a query response receiving module 710, a group determination module 715, a group command module 720, a group notification receiving module 725, and a host retrieval module 730.

The query sending module 705 sends a query for the data volume to the storage controller 230 to determine whether the data volume is available for retrieval. In one embodiment, the query sending module 705 automatically sends the query in response to the host 225 receiving a status message from the storage controller 230 that a data volume is no longer available for access (e.g. it has been deleted). For example, the host 225 may attempt to access a data volume and receive the status message in response to the attempted access.

The query response receiving module 710 receives an indication from the host 230 that the data volume is available for retrieval. The query response receiving module 630 may receive the indication in the form of a command, signal, or any suitable communication method.

The group determination module 715 determines whether a logical volume group exists for a particular data volume. For example, the group determination module 715 may determine if any logical paths exist for the logical volume group. If the group determination module is unable to locate an active logical path, the group determination module 715 may determine that the logical volume group does not exist (e.g. it has been deleted).

The group command module 720 sends a group creation command to the storage controller 230 to create a volume group corresponding to the data volume. The host 225 may send the group creation command in response to the group determination module 715 determining that a logical volume group corresponding to the data volume has been deleted. In certain embodiments, the host 225 accesses a data volume though logical paths to the logical volume group (e.g. LCU) corresponding to the data volume. Consequently, the host 225 may send a volume group creation command to create a logical volume group for the data volume in preparation of retrieving the data volume. In one embodiment, the group command module 720 sends the volume group creation command in response to the group determination module 715 determining that the logical volume group does not exist. In another embodiment, the group command module 720 sends the group creation command in response to the query response receiving module 710 receiving an indication from the host 230 that the data volume is available for retrieval. In this embodiment, the storage controller 230 may include logic to determine whether the logical volume group exists or whether it needs to be created.

In one embodiment, the group command module 635 sends a volume group creation command to a data volume in another logical volume group (because the desired logical volume group has been deleted). In one embodiment, the group command module 635 sends a volume group creation command to device 0 in LCU 0.

The group notification receiving module 725 receives a group creation notification from the storage controller 230 indicating that the group has been created. In one embodiment, the group creation notification comprises a state change notification.

The host retrieval module 730 sends a retrieval command to the storage controller 230 to retrieve the data volume. In certain embodiments, the retrieval command may include retrieval parameters that specify what storage pool to retrieve the data volume to.

Figure 8:
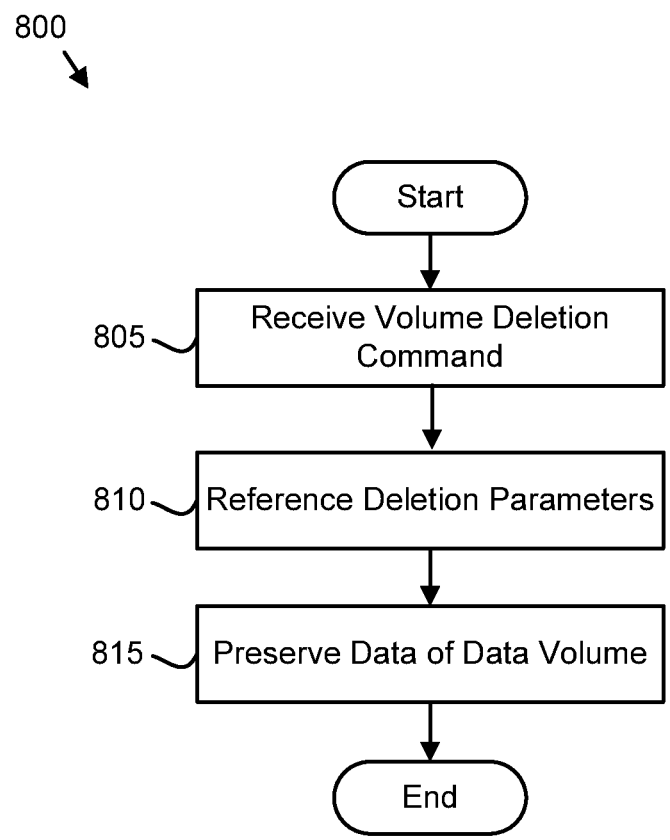
FIG. 8 is a schematic flow chart diagram illustrating one embodiment of a method for preserving a deleted data volume.

FIG. 8 illustrates one embodiment of a method 800 for preserving a deleted data volume. The method 800 substantially includes the steps to carry out the functions presented above with respect to the operation of the described apparatus and systems of FIGS. 1-3 and 5. The description of the method 800 refers to elements of FIGS. 1-3 and 5, like numbers referring to like elements.

The method 800 starts and the receiving module 505 receives 805 a deletion command to delete a data volume managed by a storage controller 230. The data volume is associated with one or more deletion parameters specifying that data of the data volume is to be preserved upon deletion of the data volume. Next, the reference module 510 references 810 the deletion parameters. The preservation module 515 then preserves 815 the data of the data volume prior to the storage controller 230 deleting the data volume. The preservation module 515 preserves the data of the data volume according to the deletion parameters. Then the method 800 ends.

Figure 9:
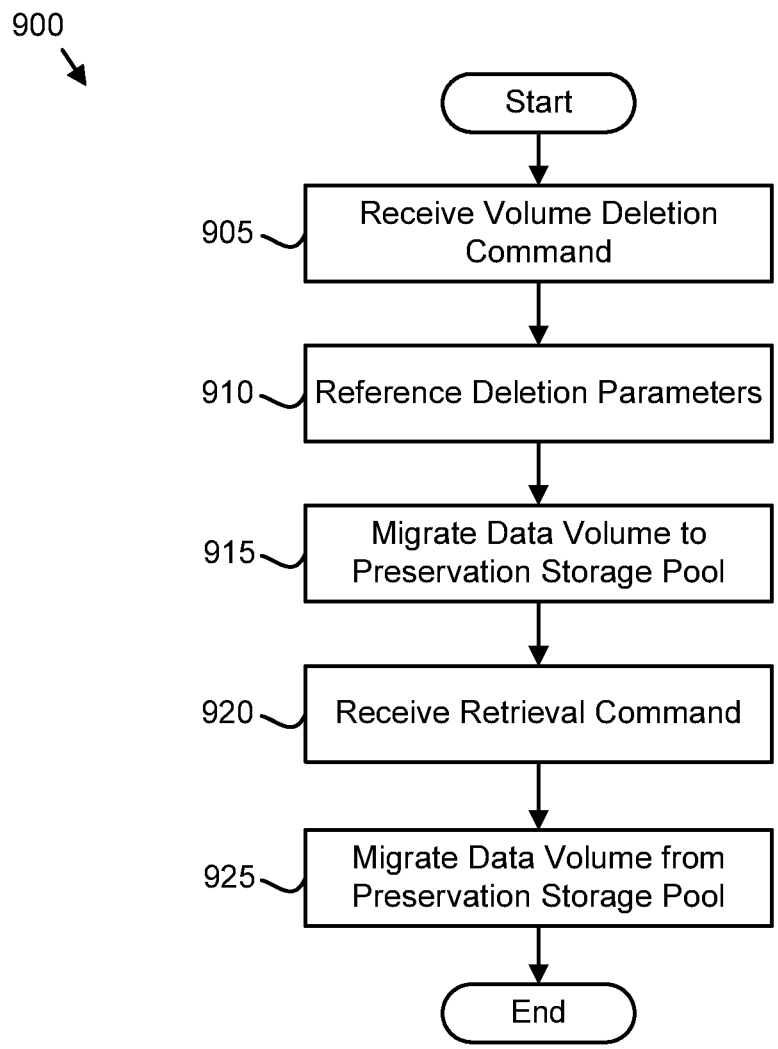
FIG. 9 is a schematic flow chart diagram illustrating another embodiment of a method for preserving a deleted data volume.

FIG. 9 illustrates another embodiment of a method 900 for preserving a deleted data volume. The method 900 substantially includes the steps to carry out the functions presented above with respect to the operation of the described apparatus and system of FIGS. 1-6. The description of the method 900 refers to elements of FIGS. 1-6, like numbers referring to like elements.

The method 900 starts and the receiving module 505 receives 905 a deletion command to delete a data volume managed by a storage controller 230. The data volume is associated with one or more deletion parameters specifying that data of the data volume is to be preserved upon deletion of the data volume. Next, the reference module 510 references 910 the deletion parameters. The preservation module 515 then migrates 915 the data volume from storage devices 310 of a primary storage pool 235 to storage devices 320 of a preservation storage pool 315. The storage devices 310 of the primary storage pool 235 and the storage devices 320 of the preservation storage pool 315 may have disparate operational characteristics. Next, the retrieval command receiving module 605 receives 920 a retrieval command to retrieve the data volume. Then, the retrieval module migrate 925 the data volume from the storage devices 320 of the preservation storage pool 315 to the storage devices 310 of the primary storage pool 235. Then the method 900 ends.

Figure 10:
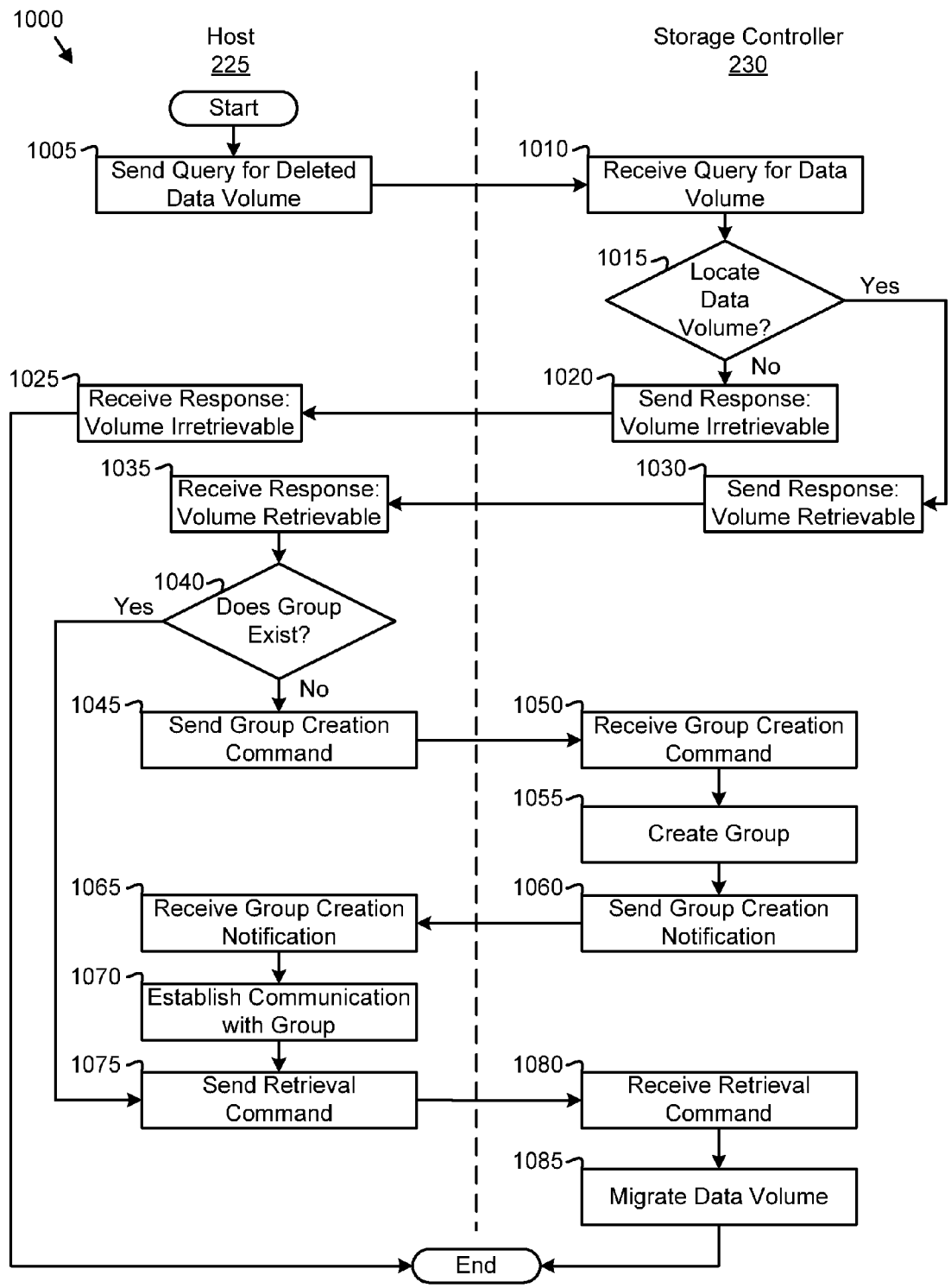
FIG. 10 is a detailed schematic block diagram illustrating another embodiment of an apparatus for preserving a deleted data volume.

FIG. 10 illustrates another embodiment of a method 1000 for preserving a deleted data volume. The method 1000 substantially includes the steps to carry out the functions presented above with respect to the operation of the described apparatus and system of FIGS. 1-6. The description of the method 1000 refers to elements of FIGS. 1-6, like numbers referring to like elements.

The method 1000 starts and the query sending module on the host 225 sends 1005 a query for a data volume that has previously been deleted to the storage controller 230 to determine whether the data volume is available for retrieval. Next, the query receiving module 620 on the storage controller 230 receives 1010 the query for the data volume. The volume locator module 625 determines 1015 whether the data volume is available for retrieval. In one condition, the volume locator module 625 is unable to locate 1015 the data volume and determines that the data volume is irretrievable. The query response module 630 then sends 1020 an indication to the host 225 that the data volume is unavailable for retrieval. On the host 225, the query response receiving module 710 receives 1025 the indication from the host 225 that the data volume is unavailable for retrieval and the method 1000 ends.

Alternatively, in the other condition, the volume locator module 625 on the storage controller 230 locates 1015 the data volume and determines that the data volume is retrievable. The query response module 630 then sends 1030 an indication to the host 225 that the data volume is available for retrieval. On the host 225, the query response receiving module 710 receives 1035 the indication from the host 225 that the data volume is available for retrieval. Next, the group determination module 715 determines 1040 whether the logical volume group corresponding to the data volume exists.

In one condition, the group determination module 715 determines 1040 that the logical volume group corresponding to the data volume does not exist (it has been deleted). The group command module 720 then sends 1045 a group creation command to the storage controller 230 to create a logical volume group corresponding to the data volume. On the storage controller 230, a group command receiving module 635 receives 1050 the group creation command from the host 225. The group creation module 640 creates 1055 a logical volume group for the storage volume. The group creation module 640 then sends 1060 a group creation notification to the host 225 indicating that the logical volume group has been created. The group notification receiving module 725 on the host 225 receives 1065 the notification that the logical volume group has been created. The host 225 establishes 1070 communication with the logical volume group (e.g. by establishing one or more logical paths to the logical volume group) and the host retrieval module 730 sends 1075 a retrieval command to the storage controller 230 to retrieve the data volume. On the storage controller 230, the host retrieval command receiving module 645 receives 1080 the retrieval command to retrieve the data volume from the host 225. The retrieval module 610 then migrates 1085 the data volume from the storage devices 320 of the preservation storage pool 315 to the storage devices 310 of the primary storage pool 235 and the method 1000 ends.

Alternatively, in the other condition, the group determination module 715 determines 1040 that the volume group corresponding to the data volume exists. The host retrieval module 730 sends 1075 a retrieval command to the storage controller 230 to retrieve the data volume. On the storage controller 230, the host retrieval command receiving module 645 receives 1080 the retrieval command to retrieve the data volume from the host 225. The retrieval module 610 then migrates 1085 the data volume from the storage devices 320 of the preservation storage pool 315 to the storage devices 310 of the primary storage pool 235 and the method 1000 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for preserving a deleted data volume, the apparatus comprising:
  a receiving module configured to receive a deletion command to delete a data volume managed by a storage controller, the data volume associated with one or more deletion parameters, the deletion parameters specifying that data of the data volume is to be preserved upon deletion of the data volume, a data retention time, and a data preservation priority;
  a reference module configured to reference the deletion parameters in response to the receiving module receiving the deletion command;
  a preservation module configured to preserve the data of the data volume prior to the storage controller deleting the data volume in response to the receiving module receiving the deletion command, the preservation module preserving the data of the data volume according to the deletion parameters received with a creation command that created the data volume, wherein the receiving module, the reference module, and the preservation module comprise one or more of hardware logic and executable code stored on a non-transitory machine-readable storage medium;
  a query receiving module configured to receive a query for the data volume from a host, wherein the host sends the query to determine that the data volume is available for retrieval;
  a group command receiving module configured to receive a group creation command from the host, the host sending the group creation command in response to determining that a logical volume group corresponding to the data volume has been deleted and is available for retrieval; and
  a group creation module configured to create a logical volume group for the deleted data volume in response to the group creation command receiving module receiving the group creation command from the host.

2. The apparatus of claim 1, wherein the preservation module preserves the data of the data volume by migrating the data volume from one or more storage devices of a primary storage pool managed by the storage controller to one or more storage devices of a preservation storage pool distinct from the primary storage pool and managed by the storage controller.

3. The apparatus of claim 2, wherein the one or more storage devices of the primary storage pool and the one or more storage devices of the preservation storage pool have disparate operational characteristics.

4. The apparatus of claim 2, further comprising:
  a retrieval command receiving module configured to receive a retrieval command to retrieve the data volume; and
  a retrieval module configured to migrate the data volume from the one or more storage devices of the preservation storage pool to the one or more storage devices of the primary storage pool in response to the retrieval command receiving module receiving the retrieval command.

5. The apparatus of claim 1, further comprising a parameter module configured to receive the deletion parameters in the creation command to create the data volume.

6. The apparatus of claim 1, further comprising:
  a volume locator module configured to locate the preserved data of the data volume and determine that the data volume is available for retrieval in response to locating the preserved data of the data volume; and a query response module configured to send an indication to the host that the data volume is available for retrieval in response to the volume locator module determining that the data volume is available for retrieval.

7. The apparatus of claim 1, further comprising:

a host retrieval command receiving module configured to receive a retrieval command from a host to retrieve the data volume; and a retrieval module configured to migrate the data volume from one or more storage devices of a preservation storage pool to one or more storage devices of a primary storage pool in response to the host retrieval command receiving module receiving the retrieval command from the host.

8. A method for preserving a deleted data volume, the method comprising:

receiving, by use of a processor, a deletion command to delete a data volume managed by a storage controller, the data volume associated with one or more deletion parameters, the deletion parameters specifying that data of the data volume is to be preserved upon deletion of the data volume, a data retention time, and a data preservation priority;

referencing the deletion parameters in response to the receiving the deletion command, the deletion parameters received in one of a creation command and the deletion command;

preserving the data of the data volume prior to the storage controller deleting the data volume in response to the receiving the deletion command, the data of the data volume preserved according to the deletion parameters received with a creatin command that created the data volume, wherein the storage controller deletes the data volume after the data of the data volume has been preserved;

receiving a query for the data volume from a host, wherein the host sends the query to determine that the data volume is available for retrieval;

receiving a group creation command from the host, the host sending the group creation command in response to determining that a logical volume group corresponding to the data volume has been deleted and is available for retrieval; and creating a logical volume group for the deleted data volume in response to receiving the group creation command from the host.

9. The method of claim 8, wherein preserving the data of the data volume further comprises migrating the data volume from one or more storage devices of a primary storage pool managed by the storage controller to one or more storage devices of a preservation storage pool distinct from the primary storage pool and managed by the storage controller, wherein the one or more storage devices of the primary storage pool and the one or more storage devices of the preservation storage pool have disparate operational characteristics.

10. The method of claim 9, further comprising:

receiving a retrieval command to retrieve the data volume; and migrating the data volume from the one or more storage devices of the preservation storage pool to the one or more storage devices of the primary storage pool in response to receiving the retrieval command.

11. The method of claim 8, further comprising:

receiving a retrieval command to retrieve the data volume from a host; and migrating the data volume from one or more storage devices of a preservation storage pool to one or more storage devices of a primary storage pool in response to receiving the retrieval command from the host.

12. A non-transitory machine-readable storage medium having computer readable program code embodied therewith to preserve a deleted data volume, the computer readable program code executed to perform the operations of:

receiving a deletion command to delete a data volume managed by a storage controller, the data volume associated with one or more deletion parameters received with a creation command that created the data volume, the deletion parameters specifying that data of the data volume is to be preserved upon deletion of the data volume, a data retention time, and a data preservation priority;

referencing the deletion parameters in response to the receiving the deletion command, the deletion parameters received in one of a creation command and the deletion command;

migrating the data volume from one or more storage devices of a primary storage pool managed by the storage controller to one or more storage devices of a preservation storage pool, distinct from the primary storage pool and managed by the storage controller, prior to the storage controller deleting the data volume in response to receiving the deletion command, the storage controller subsequently deleting the data volume from the primary storage pool;

receiving a query for the data volume from a host, wherein the host sends the query to determine that the data volume is available for retrieval;

receiving a group creation command from the host, the host sending the group creation command in response to determining that a logical volume group corresponding to the data volume has been deleted and is available for retrieval; and creating a logical volume group for the deleted data volume in response to receiving the group creation command from the host.

13. The computer program product of claim 12, wherein the one or more storage devices of the primary storage pool and the one or more storage devices of the preservation storage pool have disparate operational characteristics.

14. The computer program product of claim 12, further comprising:

receiving a retrieval command to retrieve the data volume; and migrating the data volume from the one or more storage devices of the preservation storage pool to the one or more storage devices of the primary storage pool in response to receiving the retrieval command.

15. The computer program product of claim 14, wherein the retrieval command is received from one of a host, a user, and an application.

16. A system for preserving a deleted volume, the system comprising:

a processor;

a storage controller operationally coupled to the processor, the storage controller comprising a non-transitory machine-readable storage medium storing program code executed to perform the operations of:

a receiving module configured to receive a command to delete a data volume managed by a storage controller, the data volume associated with one or more deletion parameters received with a creation command that created the data volume, the deletion parameters specifying that data of the data volume is to be preserved upon deletion of the data volume, a data retention time, and a data preservation priority;

a reference module configured to reference the deletion parameters in response to the receiving module receiving the deletion command;

a preservation module configured to migrate the data volume from one or more storage devices of a primary storage pool managed by the storage controller to one or more storage devices of a preservation storage pool, distinct from the primary storage pool and managed by the storage controller, in response to the receiving module receiving the deletion command, wherein the storage controller deletes the data volume from the primary storage pool subsequent to the preservation module migrating the data volume;

a query receiving module configured to receive a query for the data volume from a host, wherein the host sends the query to determine that the data volume is available for retrieval;

a group command receiving module configured to receive a group creation command from the host, the host sending the group creation command in response to determining that a logical volume group corresponding to the data volume has been deleted and is available for retrieval; and a group creation module configured to create a logical volume group for the deleted data volume in response to the group creation command receiving module receiving the group creation command from the host.

17. The system of claim 16, further comprising a host in communication with the storage controller, the host comprising:

a query sending module configured to send the query for the data volume to the storage controller;

a query response receiving module configured to receive an indication from the storage controller that the data volume is available for retrieval;

a group command module configured to send a group creation command to the storage controller to create a volume group corresponding to the data volume; and a host retrieval module configured to send a retrieval command to the storage controller to retrieve the data volume.

18. The system of claim 16, wherein the storage controller further comprises:

a volume locator module configured to locate the preserved data of the data volume and determine that the data volume is available for retrieval in response to locating the preserved data of the data volume;

a query response module configured to send an indication to the host that the data volume is available for retrieval in response to the volume locator module determining that the data volume is available for retrieval;

a host retrieval command receiving module configured to receive a retrieval command to retrieve the data volume from the host; and a retrieval module configured to migrate the data volume from one or more storage devices of a preservation storage pool to one or more storage devices of a primary storage pool in response to the host retrieval command receiving module receiving the retrieval command from the host.

* * * * *